Patented Jan. 8, 1924.

1,480,212

UNITED STATES PATENT OFFICE.

JACQUES DE FONDS LAMOTHE, OF PARIS, FRANCE.

PROCESS OF MANUFACTURE OF INGOTS OF PURE NICKEL FROM IMPURE OXIDES OF NICKEL.

No Drawing.   Application filed July 12, 1921.   Serial No. 484,165.

*To all whom it may concern:*

Be it known that I, JACQUES DE FONDS LAMOTHE, a citizen of the French Republic, residing in Paris, 26 Rue Laffitte, France, have invented a Process of Manufacture of Ingots of Pure Nickel from Impure Oxides of Nickel, of which the following is a specification.

This invention has for its object a process of manufacture of ingots of pure nickel in the form of cubes, cylinders, rectangular blocks and so forth, from impure oxides of nickel such, for instance, as black oxide of nickel produced by the treatment of the nickeliferous and cuprous ores of Canada.

The process in question comprises in general the combination of the three following successive operations:

1. Partial reduction of the impure oxide of nickel, previously reduced to powder, by means of a solid, liquid or gaseous reducing agent intimately mixed with the said oxide.

2. Levigation of the nickel partially reduced and powdered nickel by means of dilute solutions of hydrochloride and hydrofluoric acids; then, after drying, agglomeration of the nickel powder in the form of cubes, cylinders, rectangular blocks, etc.

3. The oxidizing, reducing and desulphurizing calcination of the agglomeration prepared as above stated.

The first operation therefore consists in causing the impure oxide of nickel in powder form to undergo partial reduction; this reduction is effected in such a manner that on the termination of the operation the nickel obtained will still contain several hundredths of oxygen, for the purposes hereinafter set forth.

In order to effect this reduction, an intimate mixture of oxide of nickel with a suitable reducing agent such as powdered wood charcoal, for instance, is heated in closed vessels (crucibles, muffles and so forth) without exposure to air and smoke.

When this preliminary operation is completed, the partially reduced nickel is crushed into fine powder and is then carefully levigated with dilute solutions of hydrochloric and hydro-fluoric acids for the purpose of removing the greater part of the impurities contained in the crude oxide. After the levigation and drying, the nickel powder is agglomerated in the ordinary manner in the form of cubes, cylinders or blocks.

The agglomerations thus obtained are then submitted to a calcination which is carried out in the same apparatuses as those which have served for the partial reduction of the crude oxide (crucibles, muffles, etc.). This calcination, first oxidizing, then reducing and desulphurizing, is performed in two distinct steps. First the agglomerations are oxidized due to the pressure of free oxide of nickel which remains in the mass at the end of the first operation of incomplete reduction. Then, secondly, a reducing agent (such for example, as carbon) is introduced into the receptacle mixed with a desulphurant (chalk for example). The reduction and the desulphurization are then performed simultaneously.

The above described calcination is oxidizing owing to the presence of the small quantity of oxide of nickel which the ingots still contain after the partial reduction according to the first operation of the process, this operation having been suitably conducted for this purpose as has been stated at the commencement of this specification. In order to render this calcination a reducing and a desulphurizing one, there is placed in the vessels which contain the ingots a certain quantity of powdered charcoal and of lime. The process above set forth in general terms may, moreover, include certain modifications which depend on the price of the raw materials employed, on their quality and on the apparatus available. Consequently the preliminary reduction may be complete in place of being partial, that is to say an operation during which the oxygen is entirely removed. In this case the oxidizing calcination of the ingots must be effected with great care, so as to completely burn the carbonaceous materials which are always present in the ingots.

As reducing materials there may be employed solid, liquid or gaseous substances other than wood charcoal, for instance use may be made of coal, anthracite, retort carbon, mineral oil coke, wood, sawdust, wood tar, vaseline, resin, hydrogen, carbonic oxide and so forth. It is desirable that the ash contained in the reducing medium employed shall be very small so that the ashes can be removed in great part during the levigation. One may also agglomerate impure oxide before its preliminary reduction and during the time in which the ingots are being heated with a reducing medium. When this reduction is finished, the reduced ingots are crushed, their powder is levigated, dried, and again fused into ingots, and these latter are submitted to calcination as already explained.

With regard to the levigation, this can, in the case in which the oxide of nickel employed is not very impure, be effected simply with hydro-chloric acid. For the desulphurizing of the ingots during their calcination, the lime employed can be replaced by carbonate of lime, carbonate of magnesia, magnesia, carbonate of soda or carbonate of potash, or any other substance capable of forming a stable sulphide at the temperature of the calcination and in the presence of an excess of carbon.

It may further be observed that the use of a desulphurizing medium is unnecessary in the case in which the oxide to be treated does not contain sulphur.

Having now particularly described the nature of my said invention and in what manner the same is to be performed, I declare that what I claim is:

The improved process for the manufacture of ingots of pure nickel from impure oxide of nickel; the said process comprising effecting the partial reduction of impure and pulverized oxide of nickel by means of a suitable reducing agent intimately mixed with the oxide; then levigating the powdered nickel when partly reduced, using weak solutions of hydrochloric and hydro-fluoric acids, then drying and agglomerating the powder of nickel in the form of ingots, then effecting, in two distinct operations, first an oxidizing calcination, and then a simultaneous reducing and desulphurizing calcination, of the ingots prepared as above set forth, the said oxidizing action being due to the small proportion of oxide of nickel which remains in the product after the partial preliminary reduction, and the reducing and desulphurizing actions being simultaneously obtained by introducing into the receptacles which contain the ingots a quantity of powdered charcoal mixed with any other body which can form a stable sulphide at the temperature of the calcination and in the presence of an excess of carbon.

In testimony whereof, I have signed my name to this specification in the presence of two witnesses.

JACQUES DE FONDS LAMOTHE.

Witnesses:
　JULES FAYVERE,
　ANDRÈ BORDILLON.